United States Patent [19]
Demorest et al.

[11] 4,218,934
[45] Aug. 26, 1980

[54] POWER TRANSMISSION CONTROL FOR A PULL-TYPE IMPLEMENT

[75] Inventors: Donald W. Demorest, Ottumwa, Iowa; Marlan J. Rolfes, Wynot, Nebr.

[73] Assignee: Deere & Company, Moline, Ill.

[21] Appl. No.: 922,030

[22] Filed: Jul. 5, 1978

[51] Int. Cl.$^2$ .............................................. G05G 9/16
[52] U.S. Cl. ................................ 74/473 R; 74/480 R
[58] Field of Search .......... 74/473 R, 473 SW, 473 P, 74/475, 479, 480 R, 364

[56] References Cited
U.S. PATENT DOCUMENTS

| | | | |
|---|---|---|---|
| 2,969,695 | 1/1961 | Christenson et al. | 74/473 X |
| 3,527,326 | 9/1970 | Griffen | 74/473 X |
| 3,987,686 | 10/1976 | Paplaski | 74/473 X |

*Primary Examiner*—George H. Krizmanich

[57] ABSTRACT

A pull-type forage harvester has a feed roll transmission shiftable between forward, reverse and neutral modes by means of a pair of identical single-acting hydraulic cylinders connected symmetrically to the rockshaft of a shifting fork and controlled through a solenoid-operated valve controlled electrically from the operator's station of the pulling tractor. Hydraulic connections are such that after completion of shifting from one transmission output mode to another, both hydraulic cylinders are open to a common hydraulic return line. However, inadvertent change of pressure in the return line will not cause shifting of the feed roll transmission as, due to the equal size of the hydraulic cylinders and the symmetrical arrangement of the cylinders with relation to the transmission shifter rockshaft, the shifting effort applied to the rockshaft by the respective cylinders would be equal but opposite, resulting in zero net shifting effort.

7 Claims, 4 Drawing Figures

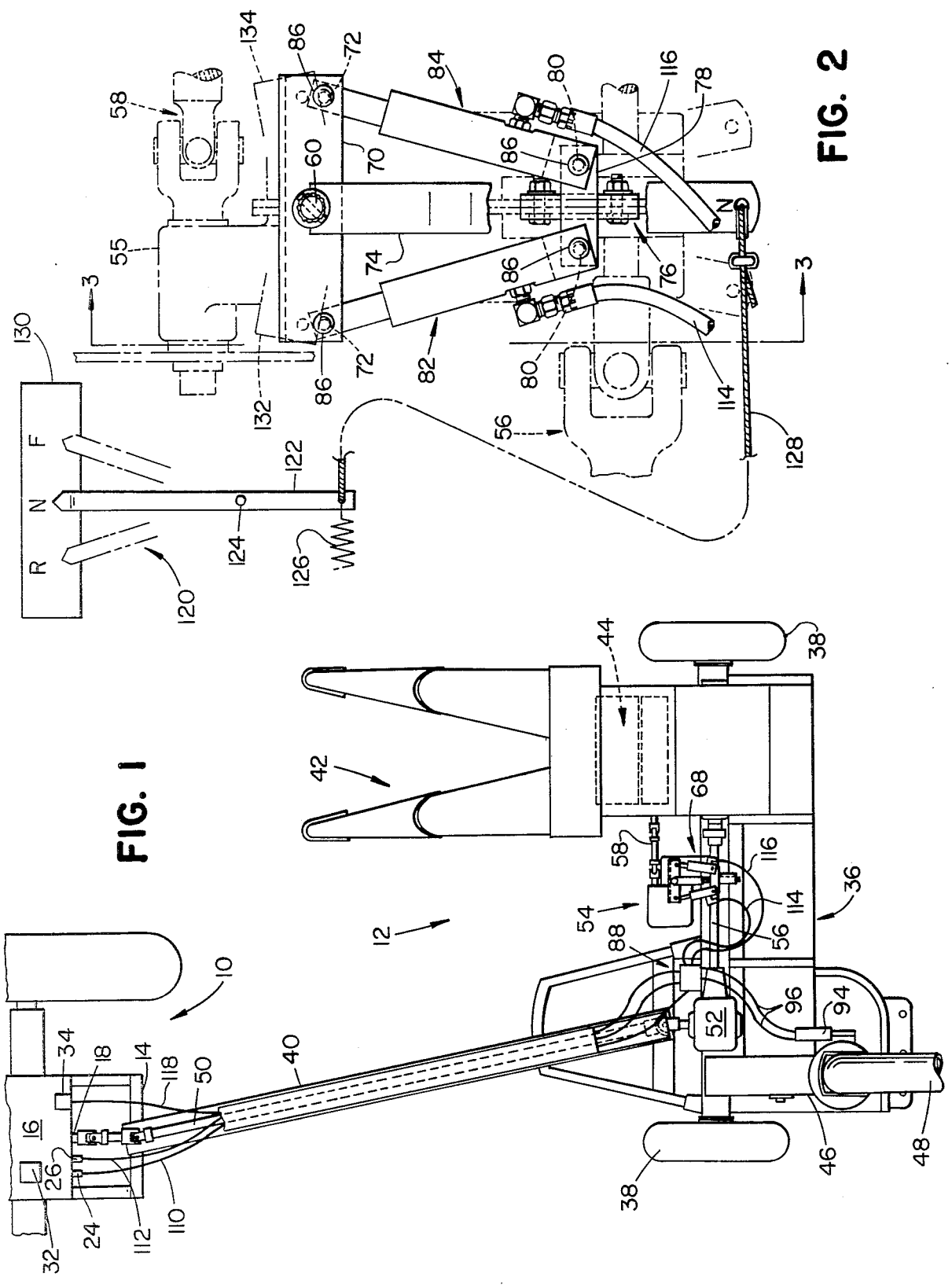

POWER TRANSMISSION CONTROL FOR A PULL-TYPE IMPLEMENT

BACKGROUND OF THE INVENTION

This invention relates to a mobile harvesting machine control system and more particularly to a control system for a power transmission assembly having a plurality of output modes for driving a functional element of the machine.

It is well known in harvesting machines to provide, within a total drive system, individual power transmission assemblies for particular functional elements of the machine, such as conveying elements. It is typical to drive such assemblies with a single input but to provide several or variable output modes including forward, neutral and reverse and perhaps variable speed. An example of the provision of such a tranmission is in the feed roll drive of a forage harvester where it is desirable to provide, in addition to the normal operating forward mode, reverse and neutral modes which are of particular value in clearing blockages from the feeding area of the machine.

Known control systems for shifting such transmissions have tended to be either costly, even though the transmissions themselves may be simple in construction, or, where attempts have been made to reduce cost, lacking in convenience and reliability. It is known, for example, to use a conventional double-acting hydraulic actuator, such as a double-acting piston-type cylinder, but the cylinder generally used is essentially an unbalanced actuator. The effective piston area on the rod side is less than on the other side of the piston so that, for a given hydraulic supply condition, speed and force of actuation is greater in one direction than in the other. This is in general inconvenient and requires more operator attention for precise control. Further, it is common for the hydraulic circuitry to be such that, after shifting, both sides of the hydraulic actuator are connected to a common portion of the hydraulic system, for example a return line to a reservoir. Thus, any change of pressure in that part of the hydraulic system is applied to both sides of the hydraulic actuator and in the case of an unbalanced actuator, such as a conventional double-acting cylinder, there will be a net unbalanced force in the actuator, possibly causing it to creep and shift the transmission from one mode to another. Such an unplanned change may be unsafe and is certainly inconvenient and may cause problems, such as serious plugging of a forage harvester header.

SUMMARY OF THE INVENTION

Accordingly, an object of the invention is to provide a control system for a power transmission assembly of a mobile harvesting machine which is simple and low in cost to manufacture and repair and, in particular, which is insensitive to inadvertent pressurizing of a hydraulic line connected to a hydraulic actuator. According to the invention, when the control is in any given setting corresponding to a given output mode of the transmission, both sides of a double-acting actuator may be open to the same portion of a hydraulic system, such as the return line to a reservoir, but any change in pressure such as a build up in pressure in that portion of the system results in two equal and opposite output efforts from the respective sides of the actuator so that the net actuator effort tending to shift the transmission is zero. This object is well realized if, in a transmission having a control member shiftable between several discrete positions corresponding to several output modes, the control member is actuated by a pair of identical, single-acting cylinders symmetrically connected to the control member so that selective pressurizing of the cylinders results in equal and opposite shifting effort on the control member.

An advantage of employing equal cylinders and symmetrical connecting means, such as equal lever arms in conjunction with a rockshaft, is that for a given hydraulic supply condition, shifting in either direction will be at equal speeds, assisting an operator to make changes smoothly and precisely and, particularly, to stop in a neutral position.

An advantage of a control system according to the invention is that use of a balanced system results in approximately equal wear rates in component parts and the simple duplicated single-acting cylinders are low in cost of manufacture and repair and convenient and simple to service.

BRIEF DESCRIPTION OF THE DRAWINGS

FIG. 1 is a semi-schematic, partial, overhead view of a tractor and pull-type forage harvester combination embodying the invention.

FIG. 2 is an enlarged, overhead, partial view of the power transmission shifter control assembly showing the hydraulic actuators and a visual indicator of the transmission output mode selected.

DESCRIPTION OF THE PREFERRED EMBODIMENT

The invention is embodied in a mobile harvesting machine, such as the tractor 10 and pull-type forage harvester 12 drawn and powered by the tractor and pivotally connected to a tractor drawbar 14 as shown in FIG. 1.

Figure 4:
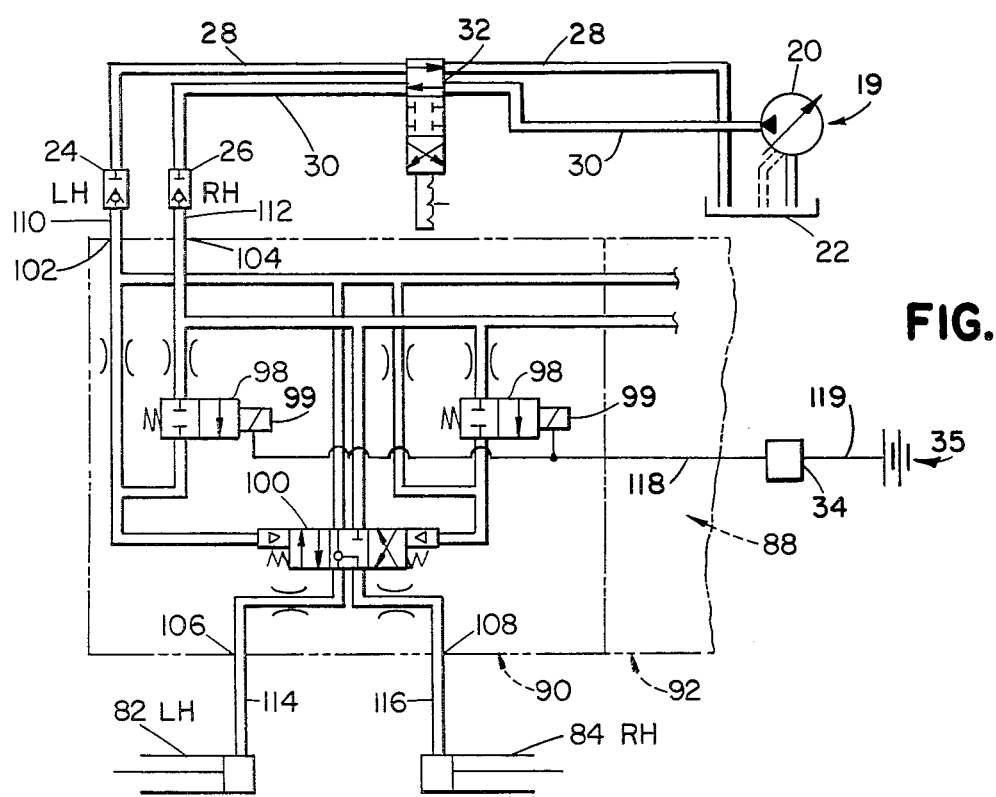
FIG. 4 is a schematic diagram of those portions of the hydraulic and electrical systems of the tractor and forage harvester combination involved in the power transmission control system.

The tractor is conventional and includes an operator's station 16, a rearwardly extending power take-off shaft 18 and a conventional hydraulic system 19 indicated only schematically and partially in FIG. 4. The system includes a pump 20, a reservoir 22 and left- and right-hand external hydraulic couplings at the rear of the tractor, 24 and 26, respectively. The couplings 24 and 26 are connected respectively to the reservoir 22 and pump 20 by internal hydraulic lines on the tractor designated for purposes of this description as return line 28 and pressure line 30, flow in these lines being controlled by a three position detented manual control directional valve 32 at the operator's station. Also at the operator's station is a normally open, double throw, momentary contact implement function control switch 34 connected to a conventional electrical power source 35 included in the tractor but shown only schematically in FIG. 4.

The forage harvester 12 is conventional and includes a main body or frame 36 supported above the ground on a pair of wheels 38 and connected to the tractor drawbar 14 by a tongue 40. A forward mounted header 42 gathers crops from a field and delivers them to a feed roll assembly 44 which conveys them rearwardly into a cutterhead (not shown) for reducing crop material particle size. The reduced crop material is transferred by an auger conveyor (not shown) to a blower 46 at the left-hand side of the machine for discharge through a swingable spout 48, usually into a trailer towed by the forage harvester.

Figure 3:
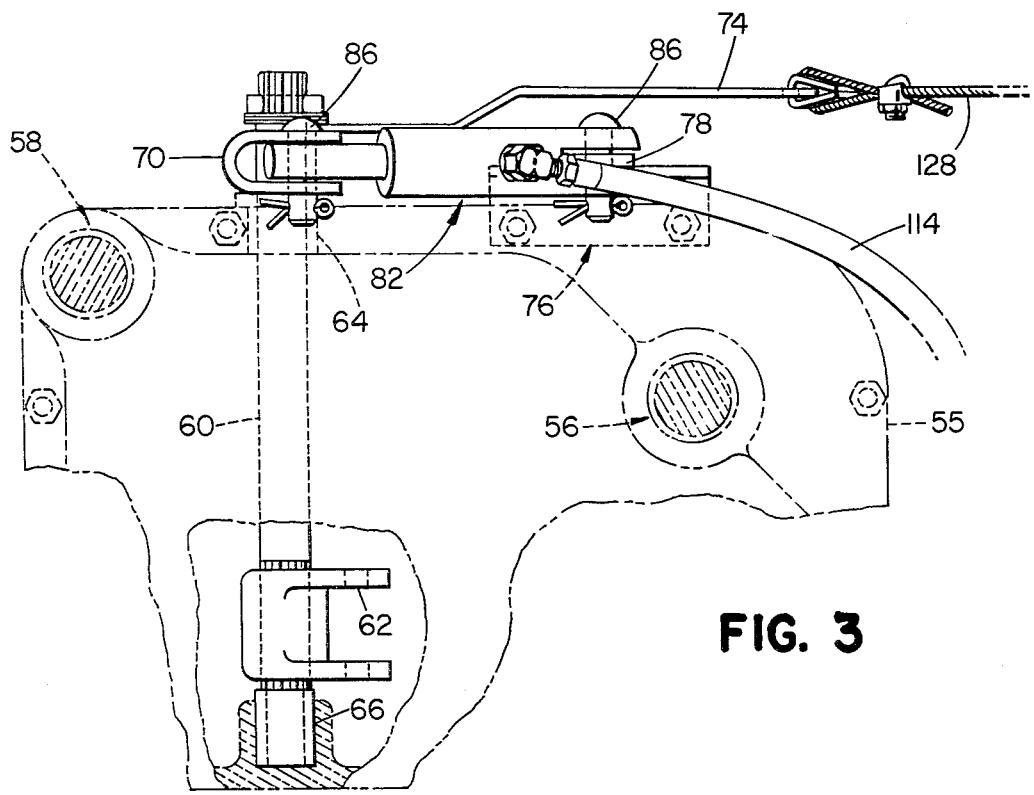
FIG. 3 is an enlarged partial view, approximately on line 3—3 of FIG. 2 showing the transmission shifter rockshaft and shifter fork and the hydraulic actuator.

Mechanical power is transmitted from the tractor to the forage harvester through a drive line 50 connected to the tractor power take-off 18 and a main gear box 52 on the forage harvester. A power transmission gear box assembly 54 is conventional and receives power from the main gear box through an input shaft 56 and transmits it to the feed roll assembly 44 by means of a flexible output shaft 58. The transmission gear box includes conventional gear assemblies (not shown) controlled by a vertically extending rockshaft 60 (seen best in FIG. 3) through a mechanically operated control member, such as the shifter fork 62 rigidly connected to a rockshaft 60. The rockshaft is supported in the gear case in upper and lower bearings 64 and 66, respectively. Mounted above the transmission gear case 54 and connected to the rockshaft 60 is a power transmission control assembly indicated generally by the numeral 68 and shown in some detail in FIGS. 2 and 3. A laterally extending cross arm 70 is attached rigidly to the upper end of the rockshaft 60 and includes a pair of opposite cylinder pivot holes 72 laterally and symmetrically spaced on opposite sides of the axis of the rockshaft 60. A rearwardly extending and upwardly offset indicator arm 74 is rigidly attached to the center of the cross arm 70. A cylinder support bracket 76 attached to the top of the transmission gear box housing 55 rearward of the rockshaft 60 includes a transverse support plate 78 having a pair of opposite laterally spaced cylinder pivot holes 80 disposed symmetrically about a fore-and-aft line passing through the axis of the rockshaft 60. Identical left- and right-hand single-acting ram-type hydraulic cylinders 82 and 84, respectively, are pivotally connected by pivot pins 86 between the holes 72 and 80 of the cross arm 70 and the support plate 78 respectively. The cross arm 70 and rockshaft 60 constitute mechanical means connecting the hydraulic cylinders 82 and 84 to the control member 62.

Also mounted on the forage harvester is a solenoid-operated control valve bank 88, a portion of which is shown schematically and partially in FIG. 4. The valve bank 88 includes a feed roll shift module 90 and additional modules, such as a spout rotation module or control valve 92 indicated only partially in FIG. 4, controlling a spout control hydraulic cylinder 94 connected to the module 92 by hoses 96.

The feed roll shift module 90 is conventional and includes a pair of solenoid-operated supply pilot poppet valves 98 each including a solenoid 99 coupled with a pilot operated spring centered directional valve such as the spool valve 100 shown by conventional symbols in FIG. 4, the spool being a control element of the valve. The feed roll shift module 90 includes a pair of inlet ports designated for this description, return port 102 and pressure port 104, and left- and right-hand outlet ports 106 and 108, respectively. Return and pressure hoses 110 and 112, respectively, are connected between the tractor couplings 24 and 26 and the inlet ports 102 and 104. Left- and right-hand cylinder hoses 114 and 116, respectively, are connected between the left- and right-hand cylinders 82 and 84. Electrical cables 118 and 119 are connected between the control switch 34 at the operator's station and the solenoid valve bank 88 and between the valve bank 88 and the electrical power source 35 respectively for supplying electrical power to the solenoid operators of the valve bank from the electrical power source 35 on the tractor.

Also mounted on the forage harvester 12 is a transmission mode indicator 120 shown only schematically in FIG. 2. It includes an indicator lever 122 carried on a pivot 124 fixed to the frame of the harvester and provided with a return spring 126. An indicator cable 128 is stretched between the rearward end of the indicator arm 74 and the indicator lever 122 so that movement of the indicator arm 74 is reflected by similar movement of the indicator lever 122. The forward end of the lever 122 registers with a calibrated indicator plate 130 also carried on the harvester and visible from the operator's station.

For operation, mechanical, hydraulic and electrical connections are made between the tractor and the forage harvester in the conventional way and the hydraulic system of the tractor is prepared by placing the control valve 32 in a locked or detented position in which the pressure and return lines 30 and 28, respectively, are open and connect, respectively, the right-hand coupling 26 to the hydraulic pump 20 and the left-hand coupling 24 to the reservoir 22.

In the field, in preparation for advancing the harvesting machine to gather crop material, the control switch 34 in the operator's station 16 is manipulated to extend the left-hand hydraulic cylinder 82 to engage forward drive for the feed roll assembly 44, the solenoids 99 of the feed roll shift module 90 of the control valve bank 88 being energized and the spool valve 100 operated to connect valve outlet port 106 with valve inlet port 104 and hence supply hydraulic pressure to the cylinder 82 extending it so as to rotate the rockshaft 60 and hence the shifting fork 62 for shifting gears in the gear box 54. When the switch 34 is released and returns to its normally open position, the solenoids 99 are de-energized and the spool of the spool valve 100 returns to a neutral position where, as can be seen from the schematic diagram of FIG. 4, both left- and right-hand cylinders 82 and 84 are open to the return line to the reservoir and the transmission setting is maintained by internal detents (not shown) in the gear box 54.

As described above, the pivot holes 72 and 80 in the rockshaft cross arm 70 and cylinder support plates 78, respectively, are arranged symmetrically with respect to the axis of the rockshaft 60 and thus the longitudinal axes of the cylinders and their lines of action are also symmetrical about the rockshaft axis. As indicated in FIG. 2 in phantom outline, by the forward and reverse positions, 132 and 134 respectively, of the cross arm 70, the strokes of the cylinders are relatively short so that approximate symmetry of the cylinders' lines of action is maintained through the shifting range. Because of this symmetry, the respective cylinders apply equal and opposite forces about the rockshaft 60 and for a given hydraulic supply condition (pressure and flow), speed of rotation of the rockshaft will be the same in both directions of rotation. This equal speed of movement is convenient and helpful to the operator, for example in shifting the transmission from the forward to the neutral mode in which the drive to the feed rolls 44 is disconnected, when he must manipulate the switch 34 to partially extend the right-hand cylinder 84 and watch the indicator 120 and preferably release the control switch 34 precisely when the indicator indicates neutral.

As indicated above, after shifting to any one of the three transmission output modes, forward, neutral or reverse, and the forage harvester 12 is operated in any one of these modes, the cylinders 82 and 84 are open to the reservoir and any change in pressure in the return or reservoir lines 28, 110 to which both cylinders are open (such as a pressure build up of several hundred pounds per square inch which may occur with some tractor hydraulic systems in such applications), will affect both cylinders equally and will not cause creeping of the transmission control assembly and inadvertent shifting of the transmission from one mode to another.

It will be noted that the present invention lends itself to a transmission control assembly design including relatively simple, low cost hydraulic cylinders and rugged mechanical parts, conveniently and simply mounted and readily accessible for service and repair, and adaptable to other mobile machine functional element applications, on self-propelled machines as well as the tractor-implement combination disclosed here.

We claim:

1. In a mobile harvesting machine having a power transmission assembly for a functional element of the machine having a plurality of output modes and a mechanically operated control member for selecting the output mode, shiftable between a plurality of discrete settings, each setting corresponding to one of the output modes, and a hydraulic power source for delivering hydraulic fluid at an operating pressure and a hydraulic reservoir and an electrical power source, a control system for the power transmission assembly comprising:

first and second hydraulic cylinders;

a control valve having first and second inlets connected to the hydraulic power source and the reservoir respectively and first and second outlets connected to the first and second hydraulic cylinders respectively and a control element movable to a plurality of positions so that the first inlet may be selectively connected to any one of the outlets and including a neutral position and means for moving the control element; and mechanical means for connecting the hydraulic cylinders to the control member of the power transmission assembly so that for a given operating pressure, the respective first and second hydraulic cylinders are selectively operable to apply equal but opposite forces to the control member.

2. The invention defined in claim 1 wherein the bore and stroke of the first hydraulic cylinder are equal to those of the second hydraulic cylinder and wherein the means for connecting the cylinders to the control member includes a rock shaft having an axis and wherein each hydraulic cylinder has an axial line of action and wherein the cylinders are disposed so that their respective lines of action are approximately symmetrical with respect to the axis of the rockshaft.

3. The invention defined in claim 1 wherein the first and second cylinders are single acting cylinders.

4. The invention defined in claim 1 wherein approximately full extension of the first cylinder moves the control member to a setting corresponding to a first output mode and approximately full extension of the second cylinder moves the control member to a setting corresponding to a second output mode and partial extension of either cylinder moves the control member to a third output mode.

5. The invention defined in claim 1 wherein when the control element of the control valve is in the neutral position, both hydraulic cylinders are connected to and open to the reservoir.

6. The invention defined in claim 1 wherein the means for moving the control element of the control valve includes a solenoid connected to the electric power source.

7. The invention defined in claim 2 and further including indicator means connected to the rockshaft for indicating the control member setting and the corresponding output mode of the power transmission assembly.

* * * * *